E. J. McCREEDY & F. A. PHILLIPS.
METER BOX.
APPLICATION FILED MAY 20, 1910.
983,311.
Patented Feb. 7, 1911.
2 SHEETS—SHEET 1.
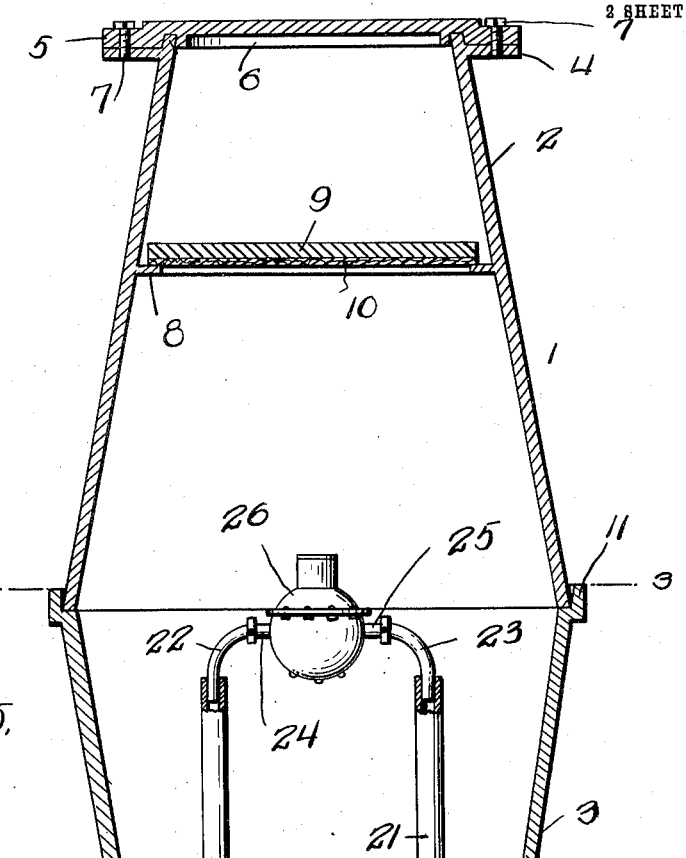
Fig. 1.
Fig. 5.
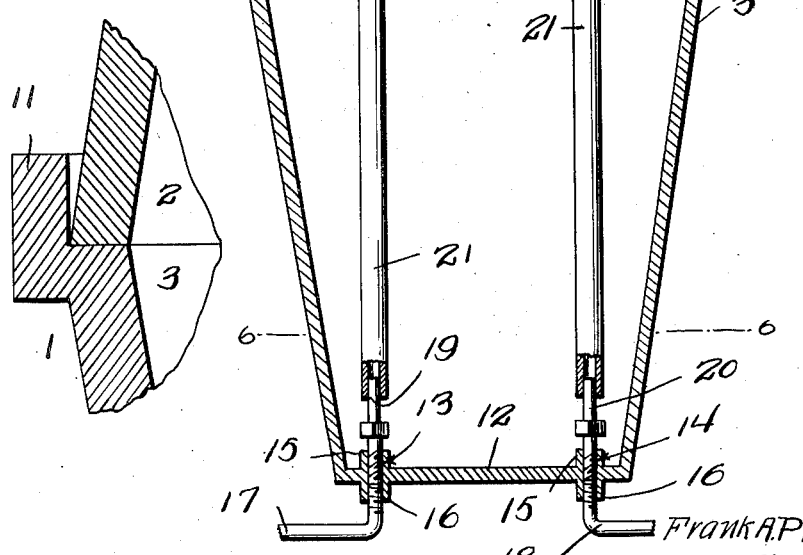
Witnesses
C. Richardson.
Inventors
Frank A. Phillips and
Edward J. McCreedy,
By Victor J. Evans
Attorney E. J. McCREEDY & F. A. PHILLIPS.
METER BOX.
APPLICATION FILED MAY 20, 1910.
983,311.
Patented Feb. 7, 1911.
2 SHEETS—SHEET 2.
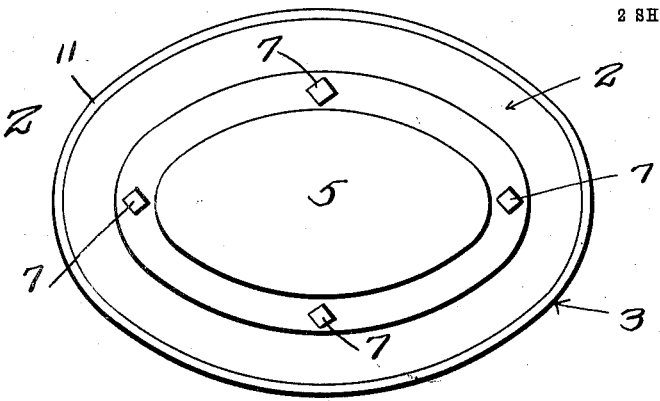
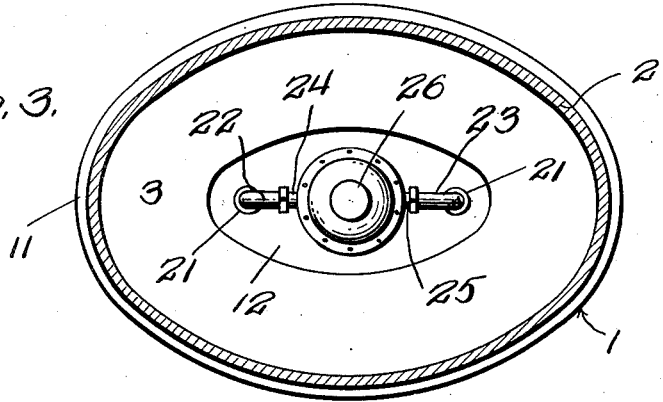
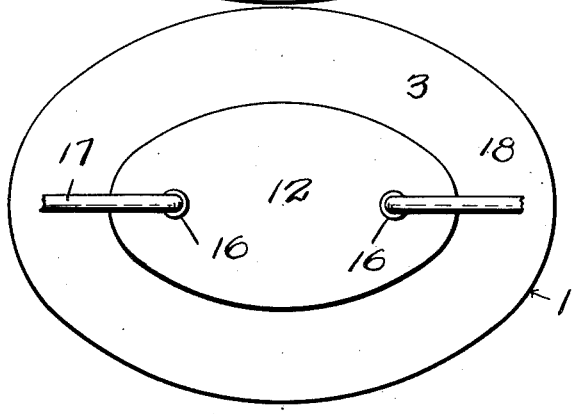
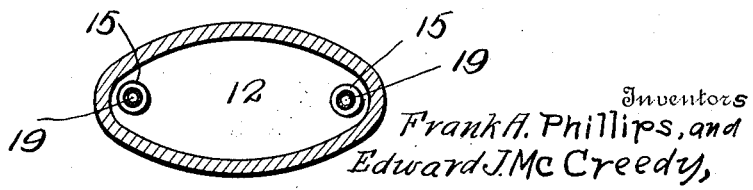
Witnesses
C. Richardson
Inventors
Frank A. Phillips, and
Edward J. McCreedy,
By Victor J. Evans
Attorney

UNITED STATES PATENT OFFICE.

EDWARD J. McCREEDY AND FRANK A. PHILLIPS, OF MOUNT CLEMENS, MICHIGAN.

METER-BOX.

983,311. Specification of Letters Patent. Patented Feb. 7, 1911.

Application filed May 20, 1910. Serial No. 562,482.

*To all whom it may concern:*

Be it known that we, EDWARD J. Mc-CREEDY and FRANK A. PHILLIPS, citizens of the United States, residing at Mount Clemens, in the county of Macomb and State of Michigan, have invented new and useful Improvements in Meter-Boxes, of which the following is a specification.

This invention relates to improvements in water meter boxes, and the object of the invention is to provide a device of this class adapted to be buried in the ground and being so constructed and arranged as to be proof against surface water and frost, and wherein different sizes and makes of meters can be positioned or taken out with ordinary tools without disturbing the box from its position in the ground.

With the above, and other objects in view, which will appear as the description progresses, the invention resides in the novel construction and combination of parts hereinafter fully described and claimed, reference being had to the accompanying drawings, which form a part of this specification.

In the accompanying drawings there has been illustrated a simple and preferred embodiment of the improvement, and in said drawings, Figure 1 is a central longitudinal sectional view of a meter box or receptacle constructed in accordance with the present invention. Fig. 2 is a top plan view of the same. Fig. 3 is a central sectional view of the same, on the line 3—3 of Fig. 1. Fig. 4 is a bottom view of the same. Fig. 5 is a detail enlarged sectional view, illustrating the manner of connecting the two sections of the box. Fig. 6 is a detail sectional view of the lower portion of the box, on the line 6—6 of Fig. 1.

In the accompanying drawings the numeral 1 designates the improved box. This box 1 is made up of a pair of sections designated by the numerals 2 and 3. The sections 2 and 3 when positioned together are of a double frusto-conical formation, as clearly illustrated in Fig. 1 of the drawings. The upper section 2 has its reduced extremity of oval formation and is provided at a suitable distance below the said extremity with a flange 4, the same adapted to form a shoulder which is adapted for the reception of the extremity or end of the top 5. The top 5 is provided adjacent its end with a spaced continuous rib 6, the same being adapted to engage with the inner face of the section 2. The rib 4, as well as the top 5, is provided with alining openings, the same being adapted for the reception of suitable securing elements designated by the numeral 7. The section 2 is further provided with a preferably centrally arranged continuous rib or offset 8, the same being adapted for the reception of a suitable closure 9. This closure 9 has its under face provided with a coating of felt or the like, designated by the numeral 10, and the said closure is adapted to serve as an additional means for preventing the entrance of water, frost, or condensation to the lower section 3 within which the meter is positoned. The lower extremity of the section 2 is of a substantially elliptical formation and the upper or enlarged portion of the lower section 3 is of a similar formation, the same being provided with an offset or shoulder 11 adapted for the reception of the end of the upper section 2. The sections 2 and 3 are connected together through any desired medium such as calking or filling the space between the member 11 and the extremity of the member 2 with any desired substance. By calking the members together it will be noted that an effective water and frost tight joint is provided.

The lower section 3 is provided with an integrally formed bottom 12 and the said bottom is provided with a pair of spaced openings 13 and 14. These openings 13 and 14 are each provided with oppositely extending integrally formed collars having interior threads and designated by the numerals 15 and 16. One threaded collar 16 projecting below the bottom 12 is adapted for threaded engagement with a suitable inlet pipe 17, which is connected with the street main, and the other collar 16 extending below the bottom 12 is provided with a similar pipe 18, which may be termed the outlet or surface pipe. Connected with the collars 15 within the section 3 are brass soldering nipples 19 and 20. These nipples are each adapted for the reception of a lead pipe 21 and both of the said pipes 21 are secured to the nipples by a wiped joint. The pipes 21 each extend upwardly a suitable distance within the section 3 and have their extremities connected with suitable couplings 22 and 23, and the said couplings are adapted to engage the threaded inlet and outlet pipes 24 and 25 of a suitable meter 26.

By the construction just described it will be apparent that when it is desired to replace a meter of a certain character and size it is merely necessary to unscrew the couplings 22 and 23 from the outlet and inlet bibs or pipes 24 and 25 of the meter 26, when by simply spreading the lead pipes 21 away from each other and from the meter the same may be readily removed, it being understood, of course, that the top 5 and the closure 9 have been removed from the section 2 before the couplings 22 and 23 are unscrewed. It will be apparent that the bendable lead pipes 21 may be extended toward or away from each other to allow their couplings 22 and 23 to engage with the bibs of meters of any size and that said meter may be readily removed without interfering with the inlet and outlet pipes or other connections.

Having thus described the invention what is claimed as new, is:—

A water meter box composed of two vertical sections each of a frusto-conical formation, one of said sections having both of its ends open, a lead calk connection between the sections, the second section having a closed bottom, said bottom being provided with a pair of spaced threaded openings, an inlet pipe connected with one of the threaded openings, an outlet pipe connected with the opposite threaded opening, a vertically extending bendable pipe connected with each of the openings, a coupling connected with the free ends of both of the pipes, the open top of the upper section having a cover, the said upper section being approximately centrally provided with a continuous offset, a closure positioned upon this offset, and said closure having its under face provided with a coating of non-heating conductive material.

In testimony whereof we affix our signatures in presence of two witnesses.

EDWARD J. McCREEDY.
FRANK A. PHILLIPS.

Witnesses:
Geo. Krieg,
W. J. Wood.